United States Patent [19]

Stanislowski et al.

[11] Patent Number: 5,016,568

[45] Date of Patent: May 21, 1991

[54] ODOR CONTROLLING ANIMAL LITTER WITH PINE OIL

[75] Inventors: Anna G. Stanislowski, Walnut Creek; J. Bruce England, Pleasanton, both of Calif.

[73] Assignee: The Clorox Company, Oakland, Calif.

[21] Appl. No.: 570,986

[22] Filed: Aug. 22, 1990

Related U.S. Application Data

[63] Continuation of Ser. No. 370,472, Jun. 23, 1989, abandoned.

[51] Int. Cl.$^5$ .............................................. A01K 29/00
[52] U.S. Cl. ................................... 119/173; 119/171; 119/172
[58] Field of Search ............................................. 119/1

[56] References Cited

U.S. PATENT DOCUMENTS

| | | | |
|---|---|---|---|
| 2,895,873 | 7/1959 | Sawyer et al. | 167/42 |
| 3,029,783 | 4/1962 | Sawyer et al. | 119/1 |
| 3,352,792 | 11/1967 | Clark et al. | 252/193 |
| 3,675,625 | 7/1972 | Miller | 119/1 |
| 3,923,005 | 12/1975 | Fry | 119/1 |
| 4,085,704 | 4/1978 | Frazier | 119/1 |
| 4,263,873 | 4/1981 | Christianson | 119/1 |
| 4,275,684 | 6/1981 | Kramer | 119/1 |
| 4,407,231 | 10/1983 | Colborn et al. | 119/1 |
| 4,421,664 | 12/1983 | Anderson | 252/94 |
| 4,469,046 | 9/1984 | Yanaton | 119/1 |
| 4,494,481 | 1/1985 | Rodriguez | 119/1 |
| 4,494,482 | 1/1985 | Arnold | 119/1 |
| 4,570,573 | 2/1986 | Lohman | 119/1 |
| 4,619,862 | 10/1986 | Sokolowski | 428/221 |
| 4,621,011 | 11/1986 | Fleischer | 428/221 |
| 4,640,225 | 2/1987 | Yanaton | 119/1 |
| 4,650,479 | 3/1987 | Insley | 604/358 |
| 4,686,937 | 8/1987 | Rosenfeld | 119/1 |
| 4,774,907 | 10/1988 | Yanaton | 119/1 |
| 4,949,672 | 8/1990 | Ratcliff | 119/1 |
| 4,957,063 | 9/1990 | Heitfeld | 119/1 |

FOREIGN PATENT DOCUMENTS

| | | |
|---|---|---|
| 841699 | 9/1976 | Belgium . |
| 410576 | 1/1991 | European Pat. Off. . |
| 1533261 | 11/1978 | United Kingdom . |

OTHER PUBLICATIONS

European Search Report from EP 90.306772 (published as EP 410576).

European Search Report from EP 90.306773 (equivalent of Ser. No. 07/370,476 (06/23/89).

*Primary Examiner*—John G. Weiss
*Attorney, Agent, or Firm*—Joel J. Hayashida; Michael J. Mazza; Stephen M. Westbrook

[57] ABSTRACT

The invention provides, in one embodiment, an odor controlling animal litter comprising:

a) adsorbent or absorbent particles; and
b) an ammonia-controlling-effective amount of pine oil carried onto said particles via an aqueous liquid dispersion and a dispersion aid therefor.

The litter can also include further adjuncts, such as fragrances, other antimicrobial additives, and the like.

8 Claims, No Drawings

ODOR CONTROLLING ANIMAL LITTER WITH PINE OIL

This is a continuation of application Ser. No. 07/370,472, filed June 23, 1989.

BACKGROUND OF THE INVENTION

1. Field of the Invention

This invention relates to an animal litter at least a portion of which has been consistently coated with an ammonia-controlling-effective amount of pine oil, said pine oil being carried in an aqueous carrier in which it can be dissolved or dispersed via a dispersion aid.

2. Brief Description of Related Art

Because of the growing number of domestic animals used as house pets, there is a need for litters so that animals may micturate, void or otherwise eliminate liquid or solid waste indoors in a controlled location. However, inevitably, waste build-up leads to malodor production.

Pine oil has been suggested in the prior art as a fragrance only, for application to a litter. For example, Frazier, U.S. Pat. No. 4,085,704, discloses the impregnation of an inorganic carrier vehicle, such as silica gel or mullite. Also, Colborn et al., U.S. No. 4,407,231 (of common assignment) discloses the microencapsulation of fragrances, including pine oil, via a polymeric slurry, which is then sprayed onto a portion of litter particles, and dried.

Miller et al., U.S. No. 3,675,625, disclose a litter which is "activated" by heating and then contacted with an odor masking agent, such as pine oil, citrus oil, camphor or the like. The agent can be added by:

"... spraying, pouring, and may be in Pure or diluted form, such as being dissolved in a volatile organic solvent." (Column 3, lines 32-34; Emphasis added)

However, the Miller et al. invention presents the disadvantages of either limited dispersal of the odor control agent on the litter (if added in pure form) or use of a volatile organic solvent, which can present manufacturing and safety hazards, as well as increase the cost of producing the litter.

Furthermore, none of the related art discloses, teaches or suggests that pine oil is an effective ammonia controlling substance when applied to an animal litter and that it does not merely mask ammonia malodors, but in fact, prevents their formation. However, the art does not disclose, teach or suggest that pine oil must be applied directly to the litter particles via a liquid aqueous carrier in combination with a dispersion aid to contact the litter consistently, rather than remain as a discrete component within the litter.

SUMMARY OF THE INVENTION

The invention provides an odor controlling animal litter comprising
(a) adsorbent or absorbent particles; and
(b) an ammonia-controlling-effective amount of pine oil carried onto said Particles via an aqueous dispersion and a dispersion aid therefor admixed with said pine oil.

The invention also comprises a method of delivering an ammonia-controlling-effective amount of an odor controlling agent to an animal litter which method comprises contacting the litter, with an aqueous dispersion of a mixture of an ammonia-controlling-effective amount of pine oil and a dispersion aid.

It is therefore an objective of this invention to provide an ammonia-controlling animal litter.

It is a further objective of this invention to provide a low cost, highly effective ammonia-controlling material for animal litter.

It is a still further object of this invention to effectively absorb/adsorb consistently the ammonia-controlling agent, synthetic pine oil, into the litter particles so as to maximize the ammonia-controlling benefit.

It is another object of this invention to avoid the use of mullite and silica gels which provide controlled release of a pine oil for its fragrance benefits only and which would decrease the consistency and effectiveness of pine oil since to be effective as an ammonia controlling agent, the pine oil must be available in high dose at the start.

It is still another object of this invention to avoid use of polymeric slurries which encapsulate a Pine oil and do not release the same except when the capsules are fractured and which use the pine oil for its fragrance benefits only.

It is yet another object of this invention to avoid the use of volatile solvents which can increase the expense and hazards of manufacture.

DETAILED DESCRIPTION OF THE PREFERRED EMBODIMENTS

The present invention provides an ammonia-controlling animal litter for use by domestic animals. It is well understood that soiled animal litters become malodorous due in part to the decomposition of nitrogenous products present in animal waste. The breakdown of these nitrogenous products into ammonia is believed to be mediated by enzymes produced by many bacteria and other microflora. As an example, urease acts as a catalyst to break down urea into ammonia via the following chemical pathway.

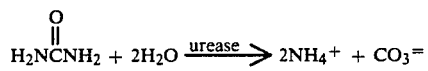

Thus, ammonia formation can be controlled or mitigated through the use of materials which are toxic to bacteria and other microflora which produce enzymes which decompose nitrogenous products.

It has been surprisingly discovered that pine oil can, in ammonia-controlling-effective amounts, control odor formation by controlling decomposition of nitrogenous products, not merely by masking malodors.

1. Pine-Oil Odor Controlling Agent

Pine oil is a complex blend of oils, alcohols, acids, esters, aldehydes and other organic compounds. These include terpenes, which include a large number of related alcohols or ketones. Some important constituents include terpineol, which is one of three isomeric alcohols having the basic molecular formula $C_{10}H_{17}OH$. One type of pine oil, synthetic pine oil, will generally have a specific gravity, at 15.5° C., of about 0.930, which is lower than the two other grades of pine oil (namely, steam distilled, and sulfate, pine oils, respectively), and will generally contain a higher content of turpentine alcohols. Other important compounds include alpha-and beta-pinene (turpentine), abietic acid (rosin), and other isoprene derivatives. Further, the apparent fragrance or strength of such fragrance, in a particular pine oil is not necessarily correlatable to the particular pine oil's germicidal activity.

Particularly effective pine oils appear to be Unipine 60 (from Union Camp, which is believed to contain 47% alpha-terpineol, and the remainder, pinene derivatives). Other concentrated products, which can contain up to 97% pure alpha-terpineol, have been used with success. In the present invention, the levels of pine oil as low as 0.001% (47% active) have been found to be effective odor control agents.

Additionally, the range of pine oil that should be an ammonia-controlling-effective amount varies from about 0.001 to 50% by weight of the composition, more preferably 0.05-25%, and most preferably 0.1-10%, by weight of the composition. In an especially effective embodiment, greater than 4% by weight of the composition is the pine oil component.

As discussed in the background of the invention, above, at least three references have discussed the use of pine oil as a fragrance additive. However, two of the references (Frazier, U.S. Pat. No. 4,085,704; Colborn et al., U.S. Pat. No. 4,407,231) either impregnate pine oil in an inorganic, porous carrier vehicle, or completely encapsulate with an organic coating, so as to provide, respectively, a slow-release product, or one which does not release at all except by fracturing of the microcapsule. The third (Miller et al., U.S. Pat. No. 3,675,625), on the other hand, teaches that the pine oil must be added to litter under apparently anhydrous conditions to avoid the presence of water. Applicants, on the other hand, have surprisingly found that pine oil itself acts as an ammonia-controlling agent for animal litters, rather than merely by masking odors. Secondly, Applicants have found that it is surprisingly beneficial and efficacious to apply pine oil to litters by using an aqueous dispersion and a dispersion aid therefor.

In the invention, it is crucial to deliver the pine oil in a liquid vehicle onto at least a portion of the litter. Since pine oil can work at relatively low concentrations, its delivery directly onto clay in small amounts is difficult to do in a consistent fashion. Merely pouring pine oil, or even atomizing or misting the oil over the litter will result in uneven application.

Accordingly, a key aspect of the invention is to contact the litter particles via an aqueous carrier with a dispersion aid therefor which is capable of evenly dispersing or solubilizing the pine oil for relatively uniform distribution directly onto litter particles. This is in direct contrast to Miller et al., U.S. Pat. No. 3,675,625, which avoids water as a carrier for pine oil used as a fragrance.

In the preferred embodiment, the invention provides an aqueous dispersion of water, the pine oil, and a dispersion aid which uniformly disperses the pine oil in the water. The preferred dispersion aids are surfactants, although hydrotropes may be appropriate. The surfactants are selected from anionic, nonionic, cationic, amphoteric surfactants, and mixtures thereof. Suitable surfactants may be found in *Kirk-Othmer, Encyclopedia of Chemical Technology*, 3rd Edition, Vol. 22, pages 346-387 (1983), and *McCutcheons's Detergents and Emulsifiers*. North American Edition, 1983, both of which are incorporated herein by reference.

Especially suitable surfactants are nonionic surfactants. Those which have an HLB of about 9-14, more preferably about 10-13, are favored. These include ethoxylated and propoxylated fatty alcohols, and ethoxylated and propoxylated alkyl phenols, having both alkyl chains of about 7-16, more preferably about 8-13 carbons in length. A preferred ethoxylated alcohol is Neodol 91-8, a $C_{9-11}$ fatty alcohol with about 8 moles of ethylene oxide per mole of alcohol, from Shell Chemical ComPany. A preferred ethoxylated alkyl phenol is Triton X-102, an ethoxylated octylphenol with about 10-12 moles of ethylene oxide per mole of alcohol. A mixture of Neodol 91-8 and Triton X-102 is also preferred.

The surfactants can be selected and amounts used to give best results in dispersing the pine oil, giving good stability and obtaining lack of phase separation. It is preferred to use the surfactants in about 0.001 to 1% by weight of the treated litter, more preferably about 0.005 to .5% by weight of the treated litter. In the aqueous dispersion, the surfactant will comprise about 0.05 to 10%, more preferably 0.1 to 5% by weight of the dispersion. Concurrently, in the dispersion, the pine oil constituent will comprise about 1 to 50%, more preferably 2 to 25%, most preferably 5 to 20%, by weight of the dispersion. It is especially desirable to use at least greater than 9% pine oil by weight in the dispersion. Further, the surfactant will be in proportion to the pine oil at a ratio of about 0.01 to 1, more preferably 0.1 to 1 of total surfactant to pine oil.

2. Litter Materials

A wide variety of materials can be used for litters. For example, porous clays are readily adaptable for use as the absorbent substrates needed for litters. Suitable litters include aluminosilicates, such as attapulgite, bentonite, montmorillonite; fossilized plant materials, expanded perlites, zeolites, gypsum, and other equivalent materials known to those skilled in the art. Sawdust, wood chips, paper or other cellulose based materials can be utilized. For instance, compacted paper, or processed, recycled pulp can be suitable for use, such as disclosed in Sokolowski et al., U.S. Pat. No. 4,619,862, and Fleischer et al., U.S. Pat. No. 4,621,011, both of which are incorporated herein by reference. Other like materials can be used, such as fruit or vegetable wastes, see Fry et al., U.S. Pat. No. 3,923,005. The litter particles have an average particle diameter of 50-5,600 microns, preferably about 100-500 microns. It is beneficial to obtain uniform sizing (such as by screening or sieving) and to have low amounts of fines, which will generate dust. Those skilled in the art will vary particle size so as to optimize absorbency/adsorbency, and to control dusting or tracking by the animal.

3. Adjunct Materials

Aluminum salts can be used to obtain an additional benefit, amongst the most important adjunct materials. A favored aluminum salt is hydrated aluminum oxide ($Al_2O_3$). A typical salt is a trihydrated aluminum salt/sodium chloride mixture. Although prior art has disclosed that aluminum salts have been used in animal bedding, see, e.g., Sawyer et al., U.S. Pat. No. 3,029,783, and Sawyer et al., U.S. Pat. No. 2,895,873, there is previously no recognition, teaching or suggestion that these aluminum salts could be combined with pine oil to provide an ammonia-control benefit. Also, certain polymers can be added which are so-called "superabsorbent" polymers to efficiently wick liquid wastes and entrap them, further bolstering odor control. Further adjunct materials that are suitable for use include dyes and pigments, such as suitably treated titanium dioxide. Additional and different germicides such as quaternary ammonium compounds, and certain 3-isothiazolones (sold under the trademark KATHON®, Rohm and Haas), and chemical deodorants, such as sodium bicarbonate, can be utilized. Other odor controlling agents such as heavy metals (see, e.g., Rodriguez et al., U.S. Pat. No. 4,494,481), enzyme inhibitors (see Heitfeld et al., U.S. patent application Ser. No. 07/223,502, filed July 25, 1988, of common assignment hereof, and incorporated by reference herein), and reducing agents, such as sodium thiosulfate or sodium bisulfite (see, e.g., Anderson et al., U.S. Pat. No. 4,421,664). Also, in conjunction with the litter, superabsorbent polymers, whether, used as box liners, cut into discrete pieces, or formed into particles, can be utilized, such as suggested in Arnold, U.S. Pat. No. 4,494,482, Insley, U.S. Pat. No. 4,650,479, and Yanaton, U S. Pat. No. 4,469,046 and 4,640,225. Further, fragrances, which are used to mask odors can be used. The fragrances can be uncoated (e.g., fragrance blends) or encapsulated (as in Colborn et al., U.S. Pat. No. 4,407,231). Further adjuncts include dedusting compounds or agents, such as water-soluble polymeric resins, e.g., polyvinyl alcohol, polyvinyl pyrrolidone, polyacrylic acid, xanthan gum, gum arabic, other natural resins, and mixtures of any of these resins.

In the EXPERIMENTAL section which follows, Applicants further demonstrate the surprising and dramatic results which are obtained when pine oil is added as an odor controlling agent to animal litters.

EXPERIMENTAL

In the following examples, stable formulations to be applied to the litters were formulated:

FORMULATION PROCEDURE

To formulate dispersions for application to the litters as in Examples 1–24 of Table I, the ingredients are all added together, with stirring to dissolve (approximately 10 minutes) Then, the surfactants are added to the solution, until evenly into solution (5–10 minutes). Finally, the pine oil is added until a milky appearance ("bloom") fully develops (5–7 minutes) and a stable, opaque solution is obtained. In some cases, however, the ingredients failed to go into solution and phase separated. This was not necessarily indicative of performance, however.

This dispersion is then sprayed onto a moving bed of litter particles, although there are other techniques of delivering the dispersion, e.gs., fluid bed, drum coating, spray tower, vibrating bed, and other ways known to those skilled in the art. At least 20%, most Preferably 30%, of the litter particles are substantially fully coated.

TABLE I

Summary of Formulas and Stabilities

| Ingredient & Formula Wt. % | 1 | 2 | 3 | 4 | 5 | 6 | 7 | 8 | 9 | 10 | 11 | 12 | 13 |
|---|---|---|---|---|---|---|---|---|---|---|---|---|---|
| Water | 92.7 | 73.3 | 92.7 | 73.3 | 92.7 | 92.7 | 92.7 | 92.7 | 92.7 | 92.7 | 92.7 | 95.7 | 95.7 |
| Dispersant | | | | | | | | | | | | | |
| Anionic Surfactant 1[1] | 0.02 | 0.02 | 0.02 | 0.02 | | | | | | | | | |
| Anionic Surfactant 2[2] | | | | | | | | | | | | | |
| Anionic Surfactant 3[3] | | | | | | | | | | | | | |
| Nonionic Surfactant 1[4] | | | | | 4.0 | | | | | | | | |
| Nonionic Surfactant 2[5] | | | | | | 4.0 | | | | | | | 1.0 |
| Nonionic Surfactant 3[6] | | | | | | | 4.0 | | | | | 4.0 | |
| Nonionic Surfactant 4[7] | | | | | | | | 4.0 | | | | | |
| Nonionic Surfactant 5[8] | | | | | | | | | 4.0 | | | | |
| Nonionic Surfactant 6[9] | | | | | | | | | | 4.0 | | | |
| Nonionic Surfactant 7[10] | | | | | | | | | | | | | |
| Nonionic Surfactant 8[11] | | | | | | | | | | | | | |
| Nonionic Surfactant 9[12] | | | | | | | | | | | | | |
| Nonionic Surfactant 10[13] | | | | | | | | | | | | | |
| Gationic Surfactant 1[14] | | | | | | | | | | | 4.0 | | |
| Isopropanol | 4.0 | 10.0 | 4.0 | 10.0 | | | | | | | | | |
| Pine Oil | | | | | | | | | | | | | |
| Unipine 60[15] | 3.3 | 16.7 | 3.3 | 16.7 | 3.3 | 3.3 | 3.3 | 3.3 | 3.3 | 3.3 | 3.3 | 3.3 | 3.3 |
| Unipine 90[16] | | | | | | | | | | | | | |
| Stability (Maximum time) | unstable | unstable | unstable | unstable | 2–4 hrs. | 2–4 hrs. | 2–4 hrs. | 2–4 hrs. | 2–4 hrs. | 2–4 hrs. | ½ hr. | ½ hr. | ½ hr. |

| Ingredient & Formula Wt. % | 14 | 15 | 16 | 17 | 18 | 19 | 20 | 21 | 22 | 23 | 24 |
|---|---|---|---|---|---|---|---|---|---|---|---|
| Water | 96.5 | 93.8 | 93.8 | 82.8 | 80.3 | 92.7 | 92.7 | 96.6 | 92.7 | 92.7 | 95.7 |
| Dispersant | | | | | | | | | | | |
| Anionic Surfactant 1[1] | | | | | | | | | | | |
| Anionic Surfactant 2[2] | | | | | | | | 0.3 | | | |
| Anionic Surfactant 3[3] | | | | | | | 4.0 | | | | |
| Nonionic Surfactant 1[4] | | | | | | | | | | | |
| Nonionic Surfactant 2[5] | | | | | 0.6 | 1.0 | | | | | |
| Nonionic Surfactant 3[6] | | 4.0 | 4.0 | 1.2 | 2.0 | | | | | | |
| Nonionic Surfactant 4[7] | | | | | | | | | | | |
| Nonionic Surfactant 5[8] | | | | | | | | | | | |
| Nonionic Surfactant 6[9] | | | | | | | | | | | |
| Nonionic Surfactant 7[10] | | | | | | 4.0 | | | | | |
| Nonionic Surfactant 8[11] | | | | | | | | | 4.0 | | |
| Nonionic Surfactant 9[12] | | | | | | | | | | 4.0 | |
| Nonionic Surfactant 10[13] | | | | | | | | | | | 4.0 |
| Gationic Surfactant 1[14] | | | | | | | | | | 4.0 | |
| Isopropanol | 0.2 | | | | | | | | | | |
| Pine Oil | | | | | | | | | | | |

TABLE I-continued

| | | | | | | | | | | | |
|---|---|---|---|---|---|---|---|---|---|---|---|
| Unipine 60[15] | 3.3 | 2.2 | | 10.0 | 16.7 | 3.3 | 3.3 | 3.3 | 3.3 | 3.3 | 3.3 |
| Unipine 90[16] | | | 2.2 | | | | | | | | |
| Stability (Maximum time) | ½ hr. | ½ hr. | ½ hr. | ½ hr. | ½ hr. | 5 mins. | 5 mins. | unstable | 2 hrs. | 1 min. | 1 min. |

[1] Stearic acid.
[2] Sodium laurate.
[3] CalSoft L-40, a $C_{11-15}$ alkyl benzene sulfonate (40% active) from Pilot Chemical Co.
[4] Neodol 25-12, a $C_{12-15}$ fatty alcohol ethoxylate with 1-2 moles ethylene oxide, from Shell Chemical Co.
[5] Triton X-102, an octylphenol ethoxylate, with 12-13 moles of ethylene oxide, from Rohm & Haas Co.
[6] Neodol 91-8, a $C_{9-11}$ fatty alcohol ethoxylate with 8 moles ethylene oxide, from Shell Chemical Co.
[7] Igepal CO 720, a nonylphenoxy poly (ethylene oxy-)ethanol, from GAF Chemical Co.
[8] Tergitol 15-F-12, a $C_{11-15}$ secondary ethoxylate, from Union Carbide.
[9] Forestall, an N-soya-N-ethyl-morpholinium ethosulfate, from ICI.
[10] Neodol 45-13, a $C_{14-15}$ fatty alcohol ethoxylate, with 1-3 moles of ethylene oxide, from Shell Chemical Co.
[11] Neodol 25-7, a $C_{12-15}$ fatty alcohol ethoxylate, with 7 moles of ethylene oxide, from Shell Chemical Co.
[12] Pluronic L-44, an ethylene oxide/propylene oxide block copolymer from BASF.
[13] Pluronic L-31, an ethylene oxide/propylene oxide block copolymer from BASF.
[14] A dimethyl, difatty alkyl quaternary ammonium chloride from Sherex Chemical Co.
[15] A pine oil with 61% terpene alcohols, 37% terpene hydrocarbons, from Union Camp.
[16] A pine oil with 95% terpine alcohols, 4% terpene hydrocarbons, from Union Camp.

In TABLE II, Examples 1-24 were compared against untreated litters for performance benefits. In the data, each example was compared against a control, an untreated clay, and ppm NH₃ generated by sample as a percentage of ppm NH₃ generated by control was used. As can be seen from the data, effective odor control was attained by diverse combinations of pine oil and boric acid.

TABLE II

Performance Results

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| % Additive Delivered[1] | 0.25 | 0.5 | 0.1 | 0.5 | 0.3 | 0.3 | 0.3 | 0.3 | 0.3 | 0.3 | 0.3 | 0.2 |
| ppm NH₃ as a % of control[2] | 55.6 | 2.8 | 83.6 | 0.9 | 69.2 | 58.6 | 61.6 | 86.3 | 77.1 | 33.6 | 50.1 | 84.0 |

| | Example | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| % Additive Delivered[1] | 0.2 | 0.2 | 0.27 | 0.22 | 0.3 | 0.5 | — | — | — | — | — | — |
| ppm NH₃ as a % of control[2] | 77.0 | 66.0 | 80.0 | 45.3 | 4.4 | 0.6 | — | — | — | — | — | — |

[1] Calculated by 30 g. of formula applied to 400 g. of clay litter.
[2] Calculated by running 3 replicates of each 50 g. example, with an untreated 50 g. clay litter sample as a control. Each sample and control were dosed with 50 ml. urine.

We claim:

The invention is not limited herein to the specific examples demonstrated and includes those equivalents which would be known to those skilled in the art. The invention is further embodied in the claims which follow.

1. An odor controlling animal litter comprising:
   (a) absorbent or absorbent particles; and
   (b) an ammonia-controlling-effective amount of pine oil carried onto said particle via an aqueous dispersion containing a dispersion aid therefor, said dispersion aid being selected from the group consisting of anionic, nonionic cationic, amphoteric surfactants, and mixtures thereof.

2. The animal litter of claim 1 wherein said surfactant is at least one nonionic surfactant.

3. The animal litter of claim 2 wherein said surfactant further comprises a mixture of an ethoxylated fatty alcohol and an ethoxylated alkyl phenol.

4. The animal litter of claim 1 wherein said ammonia-controlling amount of pine oil is present in an amount of about 0.001 to 50% by weight of the composition.

5. The animal litter of claim 4 wherein said ammonia-controlling amount of pine oil is present in an amount of at least greater than 0.4% by weight of the composition.

6. The animal litter of claim 1 wherein said adsorbent or absorbent particles are clay particles.

7. The animal litter of claim 1 wherein said adsorbent or absorbent particles are cellulose particles.

8. A method of delivering an effective amount of odor controlling agent to an animal litter comprising:
   (a) providing an absorbent or absorbent animal litter;
   (b) applying to said litter, a mixture of an ammonia-controlling effective amount of pine oil in an aqueous dispersion and a dispersion aid therefor, said dispersion aid effectively dispersing said pine oil into solution, the solution then carrying said pine oil substantially uniformly onto said litter, said dispersion aid being selected from the group consisting of anionic, nonionic, cationic, amphoteric surfactants, and mixtures thereof.

* * * * *